Figure 1:
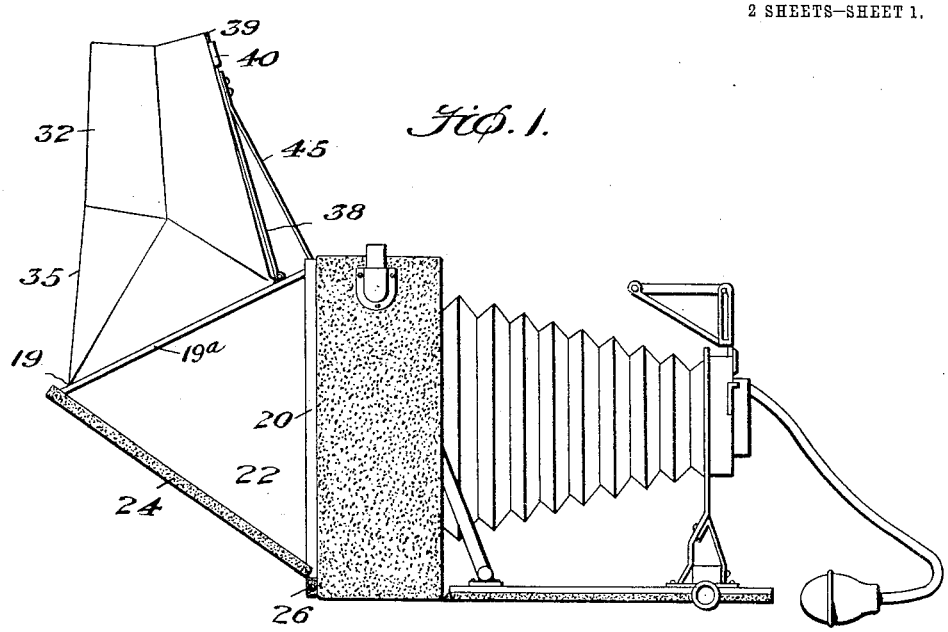

H. GINDELE.
FOCUSING HOOD FOR CAMERAS.
APPLICATION FILED SEPT. 27, 1913.

1,115,423.

Patented Oct. 27, 1914.
2 SHEETS—SHEET 1.

Inventor
Harrison Gindele
By Edson Bro's
Attorneys

Witnesses
Wm. C. Dashiell
R. L. McKeever

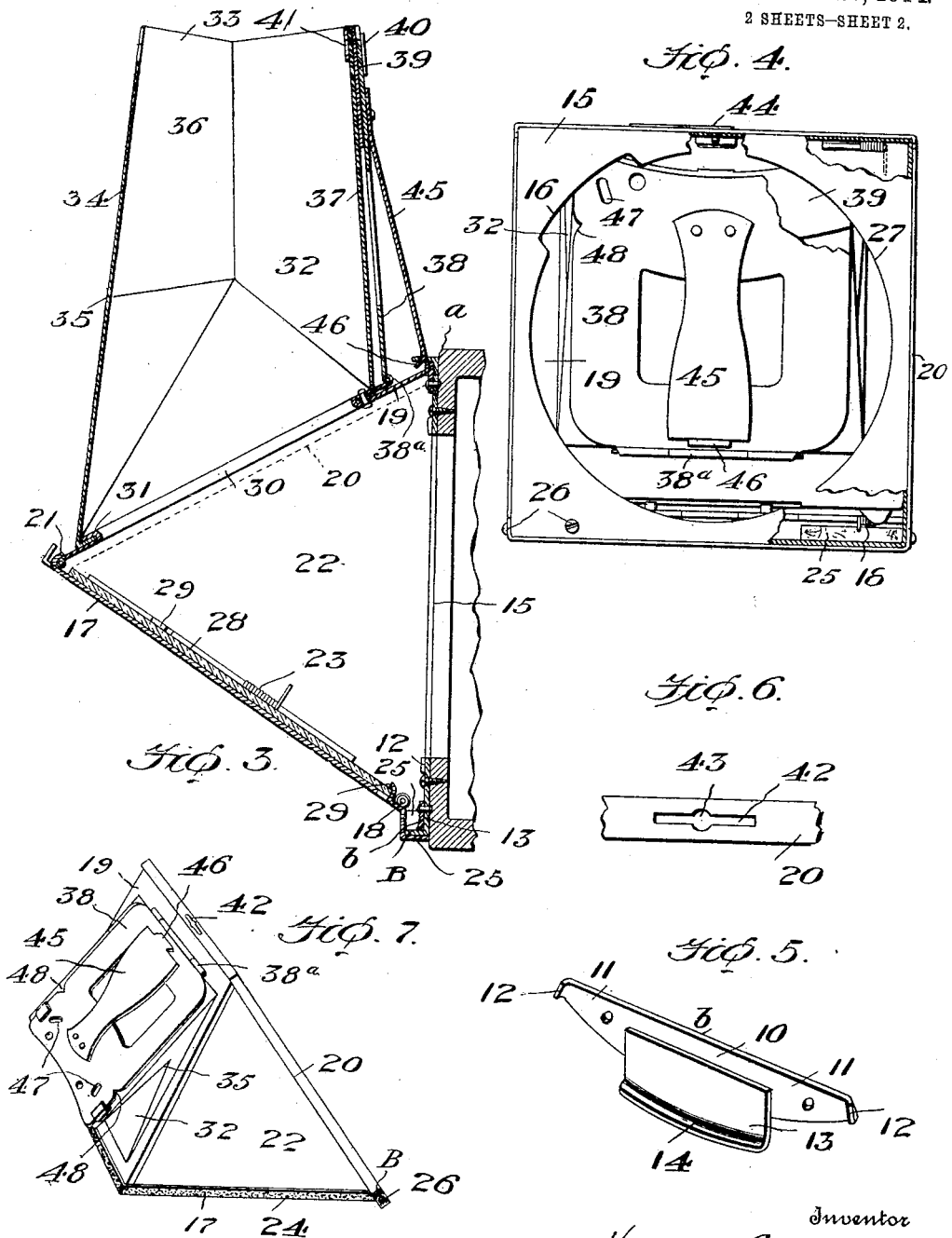

UNITED STATES PATENT OFFICE.

HARRISON GINDELE, OF CINCINNATI, OHIO.

FOCUSING-HOOD FOR CAMERAS.

1,115,423.  Specification of Letters Patent.  Patented Oct. 27, 1914.

Application filed September 27, 1913. Serial No. 792,156.

*To all whom it may concern:*

Be it known that I, HARRISON GINDELE, citizen of the United States, residing at Cincinnati, in the county of Hamilton and State of Ohio, have invented certain new and useful Improvements in Focusing-Hoods for Cameras; and I do hereby declare the following to be a full, clear, and exact description of the invention, such as will enable others skilled in the art to which it appertains to make and use the same.

This invention is an attachment for cameras, designed more particularly to facilitate the focusing of hand cameras. In cameras of this type, the image appears inverted upon a ground glass, and it has been found necessary, heretofore, to employ a focusing cloth, which covers the head of the operator, to secure desired results. In view of the disadvantages and inconveniences attendant upon the focusing through a ground glass of the ordinary type of camera, many operators depend upon a view finder in conjunction with a focusing scale, with the result that frequently pictures lack the detail and balance desired.

A purpose of this invention is to provide simple, durable, compact means which may be attached to the camera ready for instant use, whereby an operator may, upon unfolding the device, view an image in its natural position, the image appearing of the size and proportion which it will appear upon the sensitized plate or film.

The invention further aims to permit of reversibility of the focusing attachment, with the swinging of the back of the camera, thereby allowing the photographer to face the object to be photographed and compare the reflected image with the original, until he shall have focused the subject to the best advantage.

While the device may be attached as a part of a camera, it may be quickly removed therefrom, or applied thereto, without detracting from the appearance of the camera, the attachment occupying but a minimum of space when applied to the camera, or when stored.

With these and other objects in view, which shall become apparent from the following detailed description of the invention, the invention comprises a frame which is adapted to be removably coupled to retaining clips secured to the back of a camera adjacent the focusing opening thereof. This frame is provided with a pivoted base plate having a collapsible hood coöperating with a mirror secured in the frame, whereby the photographer may view a reinverted image in the mirror. The frame comprises rigid members, while the hood is composed of pliable material, the rigid members being spring-actuated and moved to their operative positions when the retaining device is released. The hood carrier plate is slidably mounted upon a supporting plate to prevent bulging of the rigid parts. Moreover, the invention is characterized, further, by suitable locking means whereby the focusing device may be retained in its adjusted positions on the back of the camera, and may be readily moved to focus an image of the greatest length vertically or horizontally.

One embodiment of the invention is illustrated in the accompanying drawings, but the construction shown therein is to be understood as illustrative, only, and not as defining the limits of the invention.

Figure 2:
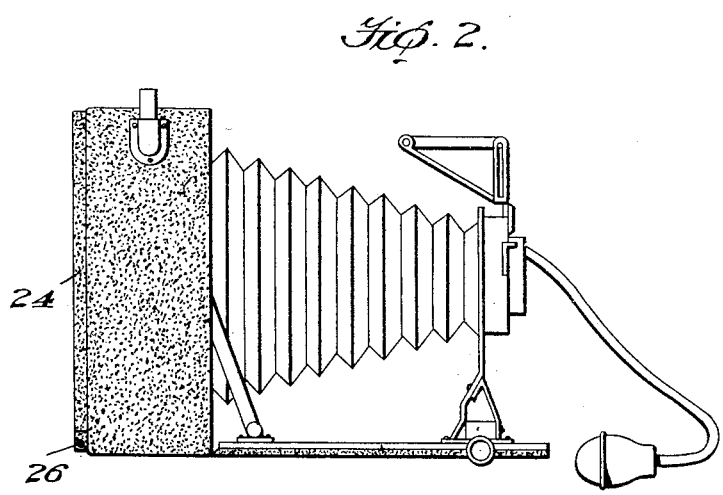

In the drawings:—Figure 1 is a side elevation of a camera with the device in its opened position thereon. Fig. 2 is a side elevation of a camera with the device in its folded position thereon. Fig. 3 is an enlarged sectional view through the attachment when opened. Fig. 4 is a plan view of the compactly folded attachment, parts being broken away and in section. Fig. 5 is a detail perspective view of a lower retaining clip. Fig. 6 is a plan view of the retaining slot in the base plate which coöperates with the closed catch and the open retaining plate. Fig. 7 is a perspective view of the device with the hood partly opened.

In the embodiment of the invention illustrated in the accompanying drawings, the attachment contemplates the employment of retaining clips which may be suitably secured to the camera adjacent the focusing opening thereof. A practical form of a clip is shown in Fig. 5, wherein a lower clip is illustrated as having a base plate 10, having lateral wings 11, with upturned lugs 12, serving the purpose of locking the attachment in position, as will be hereinafter set forth. It is preferred to employ two of these clips, although it is obvious that a greater number may be used, and, also, that the camera-back may be so constructed that only one clip is necessary. Where two clips are employed, the upper one may be secured by screws, or other fastening means to the camera-back near the top thereof as shown at a, while the lower clip is secured substantially opposite thereto on a lower portion of the back, as shown at b. Each clip is shown having one substantially straight edge and a curved edge, and each is provided with an extension 13 along the curved edge thereof. In the lower clip, b, this extension is provided with an upturned edge 14, while in the upper clip a, the upturned edge 14 may be omitted, as the retaining plate 15 of the attachment is cut away at a proper point, as at 16, to receive this portion 13. This edge 14 permits of ready application of the attachment, as the upper clip is passed through slot 16.

The attachment is shown as having a base plate 17, along one edge of which is hingedly mounted a strip B carrying the retaining plate 15. It is preferred to provide coiled springs 18 (Fig. 3) adjacent the hinges by which energy is stored to move the strip B and plate 15 outwardly away from the base plate or vice versa. Along the opposite edge of the base plate 17 is mounted a carrier-plate 19 which is connected to the base plate 17 by spring actuated hinges operating to move the carrier-plate 19 upwardly away from the base plate. The plate 19 is provided with a depending flange 19ª. The retaining plate 15 is shown provided with an upturned flange 20 around four sides thereof, one edge of which, together with the inclined stop member 21 (formed on the base plate 17), serves to limit the upward movement of the carrier-plate 19.

To each side edge of the base plate 17 is secured a triangular light closing device 22, preferably constructed of suitable sheet metal, and hinged to the base plate 17. Springs 23 are provided to act against these triangular plates 22 to cause them to move in a direction away from the base plate 17, the plates 22 being limited in their outward movement by engagment with the inturned edge 20 of plate 15 as well as by the flanged edge 24 of the base plate 17. The base plate 17, the retaining plate 15, carrier-plate 19 and light-excluding plates 22, when raised to their opened positions, form a substantially triangular prismatic attachment for the camera.

The strip B extends the full length of the base plate 17, and at convenient places, for example at each end thereof, suitable retaining blocks 25 are mounted in said strip, to which blocks is secured the retaining plate 15, said plate 15 being rigidly secured to strip B by suitable means, such as the screws 26.

The retaining-plate 15 is constructed of sheet metal and provided with an enlarged central circular opening 27 facing the ground glass of the camera, from which opening extends the notch 16, heretofore described.

On the inner face of the base plate 17 is mounted a mirror 28, which is suitably retained on the base plate 17 by clips 29 bent up from plate 17. If desired the material for the hinges may be bent from the base plate 17 and the other abutting plates.

A central opening 30 is cut into carrier-plate 19 and the edges of the plate 31 surrounding the opening are bent back upon the plate forming means for binding the edge of a collapsible hood 32 to the plate 19. When opened, the hood 32 forms a substantially rectangular structure having a view opening 33 at the upper end thereof through which the photographer may view the image on the mirror 28. The hood is provided with the rear wall 34 (which is adapted to be folded at 35), the side walls 36 and the front wall 37, the side walls 36 being foldable between walls 34 and 37. The front wall 37 is preferably not creased, but retained in a flat position against the hood plate 38, which is hinged at 38ª to the plate 19. Suitably secured at the upper free end of this wall 37 is a transverse plate 39. This transverse plate 39 is shown provided with guides 40 which fit over the edges of plate 38 permitting of a sliding movement of plate 39 on plate 38, thereby preventing buckling of the material during the opening and closing of the hood.

The upper edge of the view opening 33 may be reinforced, as at 41, with suitable material to give proper rigidity to the parts.

The flange 20 of the retaining plate is provided with a slot 42 having an enlarged opening at 43, as shown in Fig. 6. When the frame is in its closed position of Figs. 2 and 4, it is retained against opening by a spring catch 44, Fig. 4, which engages with 43 of the flanged retaining plate. To retain the hood in its proper opened position, there is provided a supporting arm 45 having an inturned end 46, adapted to fit within the slot 42. This arm 45 may be secured to the hood plate in any suitable manner.

As has been previously stated, the attachment is capable of being moved to various positions on the camera. To prevent any undesired movement of the device when folded, the lugs 12 of the retaining clips a, b, are adapted to engage slots 47 on the hood plate 38, when the attachment is in its first position on the camera, or to engage the notches 48 when in a position at right angles to the first position. The attachment must be returned to its first position before it can be detached from the camera, although it is capable of being moved thereon to any degree of a circle.

In operation the clips $a$, $b$, are placed at opposite positions on a camera adjacent the focusing opening, detaching plate 15 and using it as a guide to position the clips. The circular edge 27 of the plate 15 is slipped under flange 14 of clip $b$ until the edge 27 of plate 15 rests upon the curved edge of the clip. Assuming the attachment is in the folded position of Fig. 4, it is rotated until the notch or cut out portion 16 registers with the upper clip $a$, whereupon the plate 15 is brought into engagement with said latter clip and the device turned to a locked position, the flanges 13 passing over a part of plate 15 and retaining the attachment in position. The catch 44 is released and the resilient members operate to force back 17, plate 19 and sides 22 to their opened positions, whereupon the hood 32 may be locked open by the engagement of arm 45 with slot 42. Should it be desired to swing the back of the camera to take a picture in a different position on the sensitized plate or film, the attachment may be swung on its circular track, i. e., clips riding on edge 27, until the image appears properly in the mirror 28.

The device may be closed by depressing the hood, folding down both the sides 22, depressing plate 19 toward base plate 17 and folding plate 17 toward the camera until the catch 44 engages slot 43, whereupon the parts will assume the positions of Figs. 2 and 4. It can be removed from the camera by turning the device until the notch 16 registers with upper clip $a$, whereupon the whole attachment may be lifted out of position.

It is obvious that various changes and modifications may be made in the arrangement, the form and proportion of parts, and the right is reserved to make such changes and alterations therein, as fairly fall within the scope of the invention as specified in the appended claims.

Having thus fully described my invention, what I claim as new is:—

1. A focusing attachment for cameras comprising a collapsible frame adapted to be rotatably moved to various positions on a camera, a hood and a reflecting device carried by the frame.

2. A focusing attachment for camera comprising a collapsible frame adapted to be rotatably moved to various positions on a camera, a collapsible hood, and means to support the hood in its opened position.

3. A focusing attachment for camera comprising a frame adapted to be moved to various positions on a camera, a collapsible hood having a hood plate secured to one wall thereof, and means engaging said hood plate and frame to retain the hood in its opened positions.

4. A focusing attachment for camera comprising a collapsible frame, a carrier plate pivoted to the frame, a hood, a hood plate, and a transverse plate secured to one wall of the hood to prevent buckling of the hood material during the opening and closing operations.

5. A focusing attachment for cameras comprising a collapsible frame, a carrier plate pivoted to the frame, a hood, a hood plate, a transverse plate secured to the hood and movably mounted on the hood plate, and means to lock the hood in its opened position.

6. A focusing attachment for cameras comprising a collapsible frame having a retaining plate provided with a locking slot, a carrier plate hinged to the frame, a collapsible hood mounted on the carrier plate, a hood plate pivoted to the carrier plate, and a retaining arm having means to engage the locking slot when the hood is in its opened position.

7. A focusing attachment for cameras comprising a collapsible frame having a retaining plate provided with a locking slot, a catch to engage said slot and retain the attachment in its folded position, a carrier plate hinged to the frame, a hood carried thereby, a hood plate mounted on the carrier plate, and a retaining arm having means to engage the locking slot when the hood is in its opened position.

8. A focusing attachment for cameras comprising a base plate, a retaining plate pivoted thereto, a carrier plate pivoted to the base plate opposite to said retaining plate, light-closing plates pivoted to said base plate and coöperating with the retaining plate and carrier plate, means to retain said plates in folded relation against said base plate, and means to move said plates out of engagement with said base plate.

9. A focusing attachment for cameras comprising a base plate, a retaining plate pivoted thereto, a carrier plate pivoted to the base plate opposite to said retaining plate, light-closing plates pivoted to said base plate and coöperating with the retaining plate and carrier plate, means to retain said plates in folded relation against said base plate, means to move said plates out of engagement with said base plate, and means to limit the movement of said plates.

10. In a focusing attachment for cameras, a retaining clip adapted to be secured to a camera, a retaining plate adapted to coöperate with said clip for rotative movement on the camera, a collapsible frame connected to said plate, and a hood secured to said frame.

11. In a focusing attachment for cameras, a retaining clip adapted to be secured to a camera, a retaining plate having a substantially central opening, the peripheral wall of which rides upon said clip, a collapsible frame having a hood plate, and means on said plate for engaging said clip to lock the frame against movement when in its closed position.

12. In a focusing attachment for cameras, a plurality of oppositely positioned retaining clips adapted to be secured to a camera near the opening thereof, a collapsible frame having a retaining plate adapted to coöperate with said clips, means on each of said clips to engage portion of said frame to retain it against movement when in its closed position, and means on the clips permitting rotative movement of the frame when in its opened position.

13. In a focusing attachment for cameras, a plurality of oppositely positioned retaining clips adapted to be secured to a camera near the opening thereof, each of said clips having an accurate edge and a retaining flange extending beyond said edge, a collapsible frame having a retaining plate, said plate being provided with a substantially circular track adapted to coöperate with said clips for the rotative movement of the frame on a camera, said plate being provided with a notch to permit of the disengagement of the frame from the clips.

14. In a focusing attachment for cameras, a collapsible frame provided with a hood, said frame adapted to be engaged by clips positioned on a camera to retain the frame in its operative position, each of said clips embodying a plate having an accurate edge, a retaining flange extended beyond said accurate edge, oppositely positioned lateral wings, and lugs carried by said wings, said lugs being adapted for engagement with notches on the collapsible frame.

In testimony whereof, I affix my signature, in presence of two witnesses.

HARRISON GINDELE.

Witnesses:
JOHN BUEHLER,
MAX GINDELE.

---

Copies of this patent may be obtained for five cents each, by addressing the "Commissioner of Patents, Washington, D. C."